United States Patent
Olechnowicz

(10) Patent No.: US 9,063,234 B2
(45) Date of Patent: Jun. 23, 2015

(54) GAS-TIGHT PACKAGING OF DETECTORS

(71) Applicant: General Electric Company, Schenectady, NY (US)

(72) Inventor: Benjamin John Olechnowicz, Stow, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 59 days.

(21) Appl. No.: 13/927,189

(22) Filed: Jun. 26, 2013

(65) Prior Publication Data

US 2015/0001412 A1   Jan. 1, 2015

(51) Int. Cl.
*G01T 3/00*  (2006.01)
*H01J 47/12*  (2006.01)

(52) U.S. Cl.
CPC . *G01T 3/00* (2013.01); *H01J 47/12* (2013.01); *G01T 3/008* (2013.01)

(58) Field of Classification Search
CPC ............. G01T 3/00; G01T 3/008; H01J 47/12
USPC ...................................................... 250/390.01
See application file for complete search history.

(56) References Cited

U.S. PATENT DOCUMENTS

| 7,335,890 B2 | 2/2008 | Utterback | |
|---|---|---|---|
| 2006/0169025 A1* | 8/2006 | Wilson | 73/31.03 |

* cited by examiner

*Primary Examiner* — David Porta
*Assistant Examiner* — Abra Fein
(74) *Attorney, Agent, or Firm* — Cooper Legal Group, LLC

(57) ABSTRACT

An atomic particle detection assembly includes one or more detectors that detect atomic particles. The detectors are positioned within a first chamber having a first operating pressure. The atomic particle detection assembly includes a junction apparatus supporting the detectors. The junction apparatus defines a second chamber having a second operating pressure that is different from the first operating pressure. Sensing electronics are attached to the detectors and the sensing electronics are housed within the second chamber of the junction apparatus.

20 Claims, 4 Drawing Sheets

GAS-TIGHT PACKAGING OF DETECTORS

BACKGROUND OF THE INVENTION

1. Field of the Invention

The present invention relates generally to a detection assembly and, in particular, to an atomic particle detection assembly maintaining one or more sealed environments.

2. Discussion of the Prior Art

Neutron detectors are used in neutron bombardment and scattering experiments. In a neutron detector, neutrons, ions, atomic particles, etc. resulting from neutron reactions within a cathode shell will collide with gas(es) contained within the shell to form free electrons. These free electrons are drawn to an anode, whereupon a signal is generated. This signal is transmitted to electronics (e.g., high voltage electronics) for analysis. Signal degradation can occur when the signal is transmitted over a relatively large distance between the neutron detector and the high voltage electronics. Further, voltage breakdown in the high voltage electronics is possible as pressure in a chamber in which the voltage electronics are stored is reduced below atmospheric pressure. Accordingly, there is a need, and it would be beneficial, to provide a detector with improved signal strength and a reduced likelihood of voltage breakdown.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides an atomic particle detection assembly including one or more detectors configured to detect atomic particles. The detectors are positioned within a first chamber having a first operating pressure. The atomic particle detection assembly includes a junction apparatus supporting the detectors. The junction apparatus defines a second chamber having a second operating pressure that is different from the first operating pressure. Sensing electronics are operatively attached to the detectors and the sensing electronics are housed within the second chamber of the junction apparatus.

In accordance with another aspect, the present invention provides an atomic particle detection assembly including one or more detectors configured to detect atomic particles. The detectors are positioned within a first chamber having a first operating pressure. The atomic particle detection assembly includes a junction apparatus supporting the detectors. The junction apparatus defines a second chamber having a second operating pressure that is higher than the first operating pressure. Sensing electronics are operatively attached to the detectors and configured to receiving detection signals from the detectors. The sensing electronics are housed within the second chamber of the junction apparatus.

In accordance with another aspect, the present invention provides an atomic particle detection assembly including one or more detectors configured to detect atomic particles. The detectors are positioned within a first chamber having a first operating pressure. The atomic particle detection assembly includes a junction apparatus supporting the detectors. The junction apparatus defines a second chamber having a second operating pressure that is higher than the first operating pressure. The detector is sealed with a shoulder of the junction apparatus such that the second operating pressure is maintained with respect to the first operating pressure.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
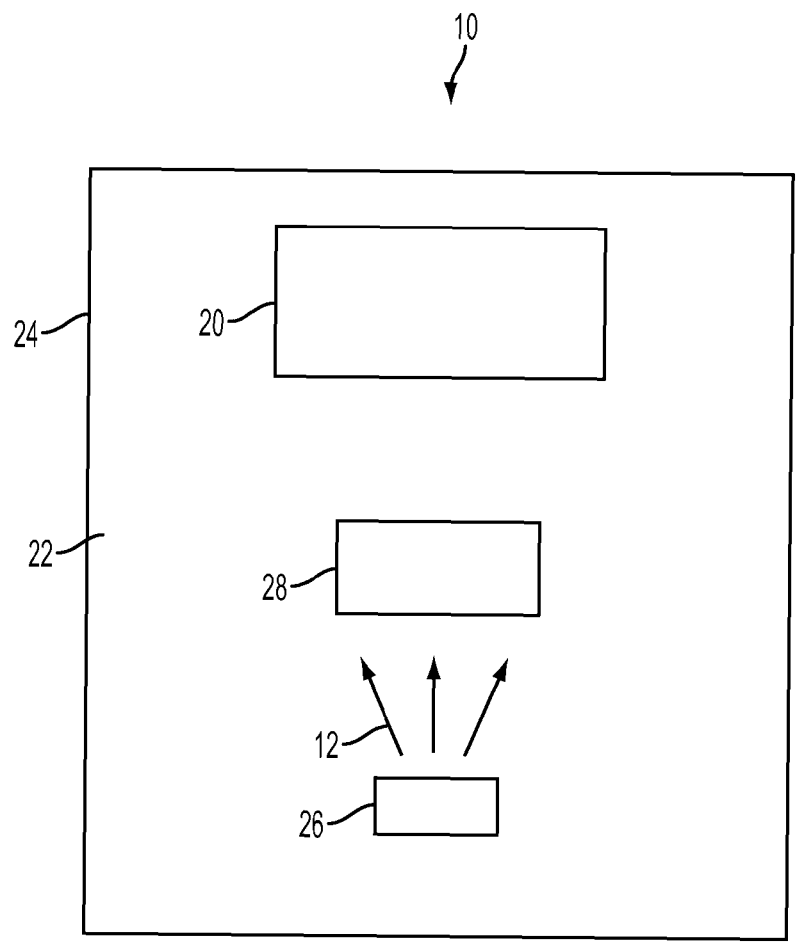
FIG. 1 is generic/schematic illustration of an example atomic particle detection assembly in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of an atomic particle detection assembly 10. It is to be appreciated that the atomic particle detection assembly 10 is illustrated somewhat generically/schematically for ease of illustration. In general, the atomic particle detection assembly 10 can detect atomic particles 12, including neutrons, etc.

The atomic particle detection assembly 10 includes a detection unit 20. The detection unit 20 is somewhat generically/schematically depicted for illustration purposes, as the detection unit 20 includes any number of constructions/configurations. In the illustrated example, the atomic particle detection assembly 10 includes one detection unit 20, but in other examples, may include any number (e.g., one or more) of detection units 20.

The detection unit 20 is positioned within a first chamber 22. The first chamber 22 is located within a chamber enclosure 24, which may include a housing, wall(s), surface(s), ceiling(s), etc. that define the first chamber 22. In some examples, the detection unit 20 may be attached to and/or supported by/within the chamber enclosure 24. The first chamber 22 includes any number of sizes, shapes, and configurations, and is not limited to the illustrated dimensions.

In an example, the first chamber 22 is maintained at a first operating pressure. For example, the chamber enclosure 24 may be evacuated of fluids, such as air and other gases, such that the chamber enclosure 24 defines a generally closed and/or sealed environment. In some examples, the first chamber 22 includes a negative operating pressure. In an example, the first operating pressure of the first chamber 22 approaches an absolute vacuum at zero Pascal (Pa). By maintaining the first chamber 22 at a negative operating pressure, atomic particle transport, including neutron transport, may be increased due to a reduced interaction between the atomic particles 12 and air molecules. Further, the likelihood of atomic particles 12 being scattered by air and, thus, escaping detection by the detection unit 20, is also mitigated by having the negative operating pressure.

The atomic particle detection assembly 10 includes a source 26 positioned within the first chamber 22. In the illustrated example, the source 26 may be positioned a distance away from the detection unit 20. The source 26 can emit atomic particles 12 (e.g., neutrons, for example). In an example, a material 28 is positioned within the first chamber 22 between the source 26 and the detection unit 20. The source 26 can emit atomic particles 12 that travel from the source 26 and towards the detection unit 20 and the material 28. At least some of the atomic particles 12 may interact with the material 28, causing scattering of the atomic particles 12. In an example, the detection unit 20 will detect at least a portion of the atomic particles 12 that have interacted with the material 28 and at least a portion of the atomic particles 12 that have not interacted with the material 28.

Figure 2:
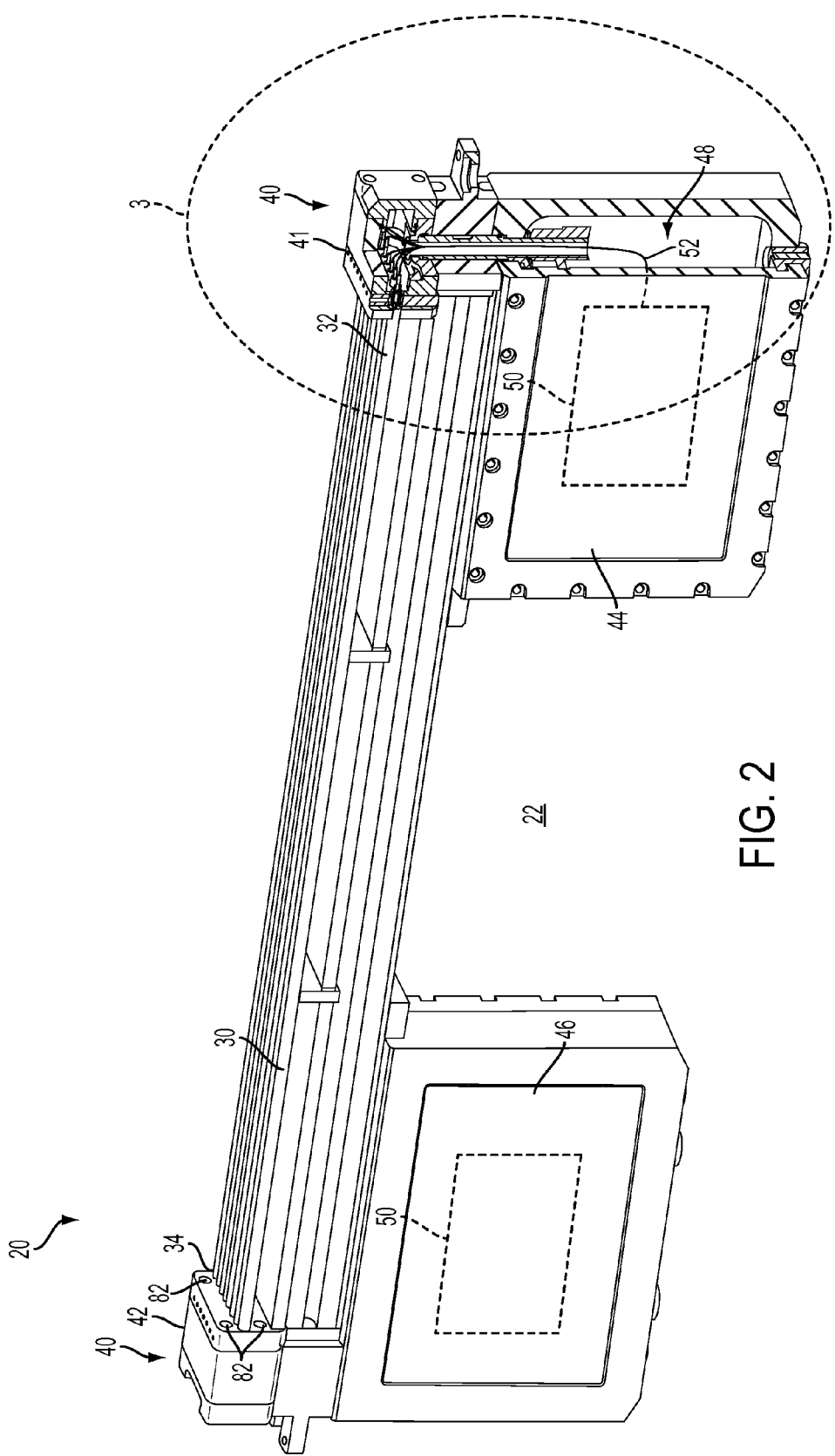
FIG. 2 is a partially torn open perspective view of an example detection unit for use in an atomic particle detection assembly.

Turning now to FIG. 2, an example of the detection unit 20 is illustrated. The detection unit 20 can include one or more position sensitive detectors 30 (e.g., detectors 30, for example) that can detect the atomic particles 12. In an example, the position sensitive detectors 30 can record where interaction of the atomic particles 12 occurs within the first chamber 22. This location determination can facilitate the study of atomic particle interactions. The position sensitive detectors 30, as part of the detection unit 20, are positioned within the first chamber 22. In the illustrated example, the detection unit 20 includes eight position sensitive detectors 30; though any number of position sensitive detectors 30 may be used. It is to be appreciated that FIG. 2 illustrates a single detection unit 20 including eight position sensitive detectors 30. In other examples, however, the atomic particle detection assembly 10 may include a plurality of detection units 20 (e.g., more than one detection unit 20), with each of the detection units 20 including one or more position sensitive detectors 30.

The position sensitive detectors 30 are each elongated, sealed tubes, and extend between a first end 32 and an opposing second end 34. The position sensitive detectors 30 in this example extend generally parallel with respect to each other and substantially contained within a plane. In an example, the position sensitive detectors 30 are spaced apart from each other, with a gap, space, or the like extending between adjacent position sensitive detectors 30. In other examples, however, the position sensitive detectors 30 can be positioned in relatively close contact with each other, such that the size of the gap, space, etc. is reduced and/or minimized. In still further examples, the position sensitive detectors 30 can be offset in multiple planes (e.g., two planes, for example) to minimize gaps. By reducing the size of this gap, space, etc. that separates adjacent position sensitive detectors 30, the number of atomic particles 12 (e.g., neutrons, etc.) that pass through the gap, space, etc. without interacting with the position sensitive detectors 30 is reduced. In another example, the position sensitive detectors 30 can be positioned so as to be in contact with each other, such that the gap, space, etc. is eliminated. While the position sensitive detectors 30 include any number of sizes and shapes, in one example, the position sensitive detectors 30 each include a diameter of about 8 mm (0.31 inches). In other examples, the position sensitive detectors 30 are not limited to the substantially cylindrical shape, and instead may include rectangular shapes, elliptical shapes, etc.

The position sensitive detectors 30 can detect the atomic particles 12 within the first chamber 22. In an example, the position sensitive detectors 30 are each substantially hollow, so as to form a sealed chamber. The sealed chamber of the position sensitive detectors 30 can be evacuated of air and filled with gas(es) (e.g., $He_3$, etc.) that facilitate neutron detection. The position sensitive detectors 30 can include detection structures, such as an anode, cathode, etc., positioned within the sealed chamber of the position sensitive detectors 30. In one example, the position sensitive detectors 30 can detect low energy neutrons with energy levels less than approximately $3.2 \times 10^{-12}$ J (20 MeV), for example. In other examples, the position sensitive detectors 30 can detect nearly any type of atomic particles within any energy range that facilitates operation of the position sensitive detectors 30.

The detection unit 20 includes at least one junction apparatus 40 for supporting the position sensitive detectors 30. In the illustrated example, the at least one junction apparatus 40 includes a pair of junction apparatuses 40 disposed at a first end 41 and an opposing second end 42 of the detection unit 20. In an example, one junction apparatus 40 (illustrated as being partially torn open in FIG. 2) can support the first end 32 of the position sensitive detectors 30. In an example, the other junction apparatus 40 can support the opposing second end 34 of the position sensitive detectors 30. It will be appreciated that the junction apparatuses 40 are generally identical to each other, and may be mirror images.

The junction apparatus 40 includes a first housing 44 and a second housing 46. In an example, the first housing 44 (illustrated as being partially torn open in FIG. 2) can be located at the first end 41 of the detection unit 20. In an example, the second housing 46 can be located at the second end 42 of the detection unit 20. The first housing 44 and second housing 46 can be substantially identical in structure. For example, each of the first housing 44 and second housing 46 can include a second chamber housing 48 positioned therein. The second chamber housing 48 defines a substantially hollow, closed structure that is sealed from the first chamber 22.

The second chamber housing 48 can support, for example, sensing electronics 50 that are operatively attached to the position sensitive detectors 30 by wires 52. It is to be appreciated that the sensing electronics 50 are illustrated in broken/dashed line form, as the sensing electronics 50 are normally not visible within the first housing 44 or second housing 46. The sensing electronics 50 can send and/or receive detection signals to/from the position sensitive detectors 30. In one example, the sensing electronics 50 include a preamplifier board that can receive current from the position sensitive detectors 30 that is related to atomic particle detection. In another example, the sensing electronics 50 include high voltage electronics, such as in a range of about 1500 volts. Indeed, the sensing electronics 50 include any number of structures, and are not limited to the examples/illustrations described herein.

Figure 3:
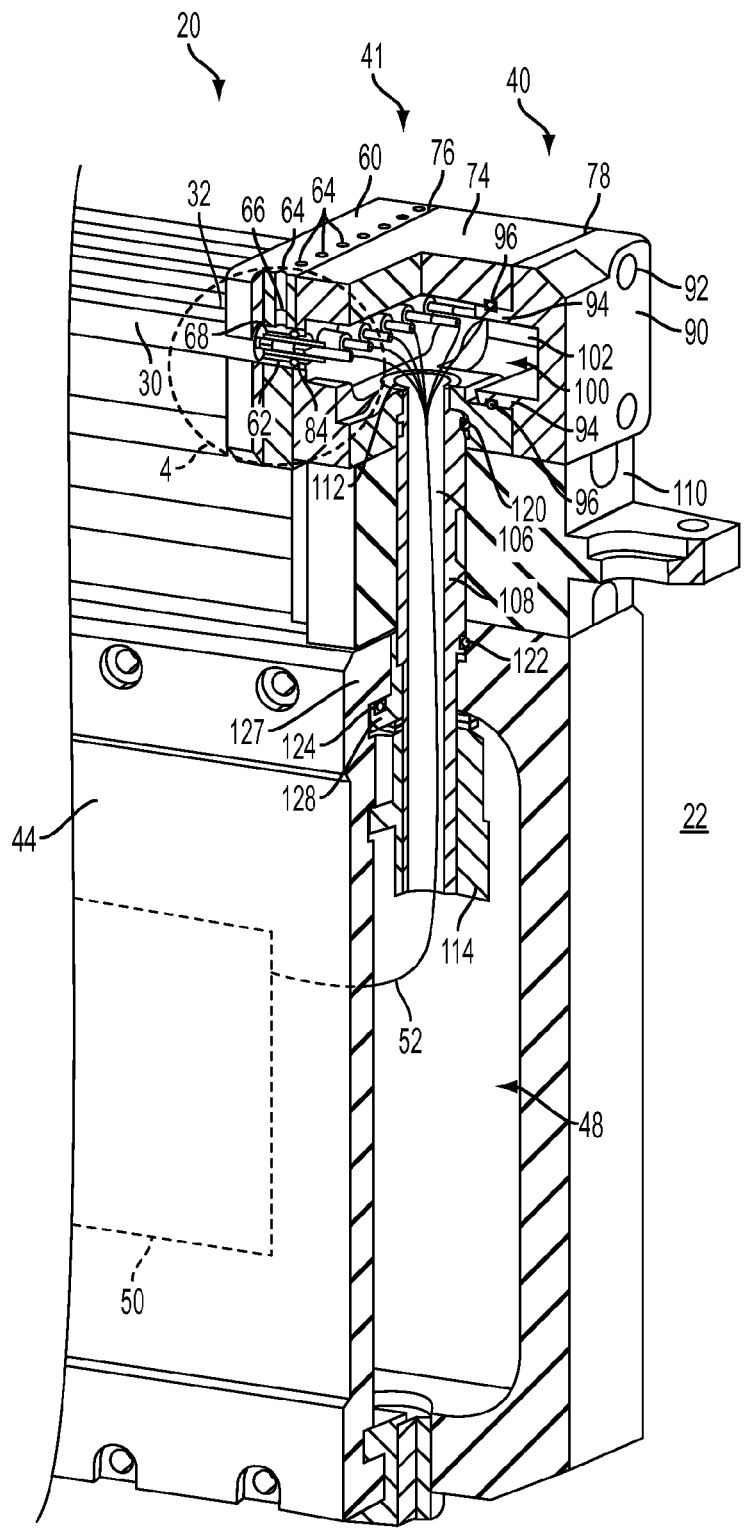
FIG. 3 is an enlarged, partially torn open perspective view of a detail taken at circular section 3 of FIG. 2 of an end of the detection unit.

Turning now to FIG. 3, the first end 41 of the detection unit 20 is illustrated as being partially torn open to show at least some structures of the detection unit 20 that may normally not be visible. In operation, the first end 41 is generally closed off and fully formed. Additionally, it will be appreciated that while only the first end 41 of the detection unit 20 is illustrated in FIG. 3, the second end 42 of the detection unit 20, including the junction apparatus 40, second housing 46, etc., can be generally identical to the first end 41, and need not be described in detail again.

The junction apparatus 40 can include an attachment plate 60. The attachment plate 60 is positioned near the first end 32 of the position sensitive detectors 30 so as to support the position sensitive detectors 30. The attachment plate 60 includes any number of materials, including stainless steel, aluminum, etc. In an example, the attachment plate 60 defines a plane that is substantially perpendicular to a direction along which the position sensitive detectors 30 extend.

The attachment plate 60 can include one or more detector openings 62 extending through the attachment plate 60. In an example, the detector openings 62 are sized and shaped to receive the position sensitive detectors 30. It will be appreciated that only one of the detector openings 62 is illustrated in FIG. 3, as the other detector openings 62 are obscured from view. The other detector openings 62 can be similar or identical in size and shape to the illustrated detector opening 62. In an example, the detector openings 62 are sized and shaped to receive substantially cylindrical position sensitive detectors 30 that have a diameter of about 8 mm (0.31 inches).

The attachment plate 60 can include one or more securing openings 64. The securing openings 64 can extend from a surface of the attachment plate 60 inwardly towards an interior portion of the attachment plate 60. In an example, the securing openings 64 extend from an upper surface of the attachment plate 60 towards the detector openings 62. In the illustrated example, the securing openings 64 may extend towards the detector openings 62. In an example, the securing openings 64 are each sized and shaped to receive a securing device 66. The securing device 66 includes any number of structures, including screws, bolts, nuts, other types of mechanical fasteners, adhesives, or the like. In some examples, the securing devices 66 can pass through the securing openings 64 so as to contact/engage the position sensitive detectors 30. For example, the securing devices 66 can engage and hold a tube portion 68 of the position sensitive detectors 30 so as to limit movement of the position sensitive detectors 30 with respect to the attachment plate 60.

The junction apparatus 40 can include a manifold portion 74. The manifold portion 74 extends between a first end 76 and an opposing second end 78. In an example, the first end 76 of the manifold portion 74 can be positioned adjacent and in contact with the attachment plate 60. The first end 76 of the manifold portion 74 can define a substantially flat surface, so as to match a substantially flat surface of the attachment plate 60. In other examples, however, the first end 76 of the manifold portion may include one or more projections, grooves, undulations, or the like to match a surface shape of the attachment plate 60.

The manifold portion 74 and attachment plate 60 can be attached in any number of ways. In an example, the manifold portion 74 and attachment plate 60 can be attached by mechanical fasteners (e.g., screws, nuts, etc.). In such an example, the attachment plate 60 includes one or more attachment openings 82 (visible in FIG. 2 at second end 42 of the junction apparatus 40) that can receive the mechanical fasteners. In operation, the manifold portion 74 can be drawn towards and attached to the attachment plate 60. In other examples, the attachment plate 70 and manifold portion 74 can be attached by welding, adhesives, etc., or by being one piece formed, for example.

The manifold portion 74 includes one or more detector openings 84 extending through the manifold portion 74. In an example, the detector openings 84 are sized and shaped to receive the position sensitive detectors 30. In an example, the detector openings 84 are sized and shaped to receive position sensitive detectors 30 that have a diameter of about 8 mm (0.31 inches). The detector openings 84 can substantially match a location of the detector openings 62 in the attachment plate 60. As such, the position sensitive detectors 30 can pass through the detector openings 62 of the attachment plate 60 and the detector openings 84 of the manifold portion 74.

The junction apparatus 40 can include a service plate 90. The service plate 90 can be positioned adjacent and in contact with the second end 78 of the manifold portion 74. The service plate 90 can be attached in any number of ways to the manifold portion 74. In an example, the service plate 90 includes one or more service openings 92 extending through the service plate 90. The service openings 92 are sized and shaped to receive one or more mechanical fasteners (e.g., screws, nuts, bolts, etc.). The manifold portion 74 can include corresponding openings that match a location of the service openings 92, such that the manifold portion 74 can be attached to the service plate 90. In other examples, the manifold portion 74 and service plate 90 are not limited to attachment by mechanical fasteners, and instead can be attached by welding, adhesives, one piece formed, etc. The service plate 90 can be selectively removed from the manifold portion 74 to provide maintenance (e.g., repairing, replacing, etc.) of the position sensitive detectors 30, wires 52, etc.

In one example, the service plate 90 includes an extension portion 94. The extension portion 94 can extend outwardly from the service plate 90 towards the manifold portion 74. In an example, the extension portion 94 can extend within the manifold portion 74. An outer radial surface of the extension portion 94 can be positioned adjacent and/or in contact with an inner radial surface of the manifold portion 74. In one example, a service seal 96 can be provided between the extension portion 94 and the manifold portion 74 so as to limit the ingress/egress of air, gas, fluid, etc. past the service seal 96. The service seal 96 can include, for example, an elastically deformable that can be compressed so as to form a seal with adjacent surfaces.

The junction apparatus 40 can include a second chamber 100. The second chamber 100 is positioned at least partially within the junction apparatus 40. In an example, the second chamber 100 has a second operating pressure that is different from the first operating pressure. In at least one example, the second operating pressure is higher than the first operating pressure. In some examples, the second operating pressure includes a pressure that is generally equivalent to atmospheric pressure, such as about 101 kilopascal (kPa) (14.7 psia). The second chamber 100 includes any number of fluids or gases, including air, etc.

The second chamber 100 can include a second chamber cavity 102 located within the junction apparatus 40. In an example, the second chamber cavity 102 is defined by the manifold portion 74 and the service plate 90. The second chamber cavity 102 is a substantially hollow structure located within the manifold portion 74 and service plate 90. The second chamber cavity 102 is sealed so as to limit the passage of air, gas, fluids, etc. between the second chamber cavity 102 and the first chamber 22 at an exterior of the junction apparatus 40. In one example, the service seal 96 will limit the passage of air, gas, fluids, etc. between the second chamber cavity 102 and the first chamber 22. The second chamber cavity 102 can be maintained at the second operating pressure. The second chamber cavity 102 is sized and shaped to accommodate for ends of the position sensitive detectors 30 that extend into the second chamber cavity 102. In another example, the second chamber cavity 102 is sized and shaped to accommodate for the wires 52 that extend from the position sensitive detectors 30.

The second chamber 100 can include a second chamber channel 106. In an example, the second chamber channel 106 is defined by a conduit 108 extending between a first end 112 and an opposing second end 114. The first end 112 is positioned within the manifold portion 74 and can define an opening, aperture, etc. through which the wires 52 can pass through. The second chamber channel 106 can extend through an alignment structure 110 positioned adjacent and below the manifold portion 74. The second end 114 of the second chamber channel 106 can extend towards the second chamber housing 48.

The second chamber channel 106 is substantially hollow, and is sized and shaped to accommodate the wires 52 to pass through. In an example, the second chamber channel 106 is in fluid communication with the second chamber cavity 102, such that the second chamber channel 106 is maintained at the second operating pressure. While being in fluid communication with the second chamber cavity 102, the second chamber channel 106 can be sealed with respect to the first chamber 22. As such, air, gas, fluids, etc. are generally limited from flowing between the second chamber channel 106 and the first chamber 22.

In an example, the second chamber channel 106 can include one or more chamber seals to maintain the second chamber channel 106 at the second operating pressure. In an example, a first chamber seal 120 is positioned in contact with the conduit 108 and the manifold portion 74. The first chamber seal 120 can limit the passage of air, gas, fluids, etc. through a junction between the conduit 108 and the manifold portion 74. The first chamber seal 120 can include an elastically deformable material that can be compressed so as to form a seal.

In an example, a second chamber seal 122 is positioned in contact with the conduit 108 and the housing (e.g., first housing 44, second housing 46). The second chamber seal 122 can limit the passage of air, gas, fluids, etc. through a junction between the conduit 108 and the first housing 44. The second chamber seal 122 can include an elastically deformable material that can be compressed so as to form a seal. In another example, a third chamber seal 124 is positioned in contact with a portion of the first housing 44 (e.g., a first chamber back housing 127) and a housing cap 128. In this example, the third chamber seal 124 can limit the passage of air, gas, fluids, etc. through a junction between the first chamber back housing 127 and the housing cap 128. The third chamber seal 124 can include an elastically deformable material that can be compressed so as to form a seal. In some examples, the first chamber seal 120, second chamber seal 122, and/or the third chamber seal 124 can comprise an O-ring. It will be appreciated that the chamber seals (e.g., first chamber seal 120, second chamber seal 122, and third chamber seal 124) are not limited to the location, number, configuration, etc. as illustrated, and that in other examples, any number of chamber seals may be provided at any number of locations.

The second chamber 100 can include the second chamber housing 48. In an example, the second chamber housing 48 is in fluid communication with the second chamber channel 106 at the second end 114 of the second chamber channel 106. As such, in some examples, the second chamber housing 48 is maintained at the second operating pressure. The second chamber housing 48 can be sealed so as to limit the passage of air, gas, fluids, etc. between the second chamber housing 48 and the first chamber 22. In some examples, the second chamber housing 48 will house the sensing electronics 50 and the wires 52. As such, the sensing electronics 50 and wires 52 are housed within the second chamber 100, which is maintained at the second operating pressure (e.g., atmospheric pressure, for example).

Figure 4:
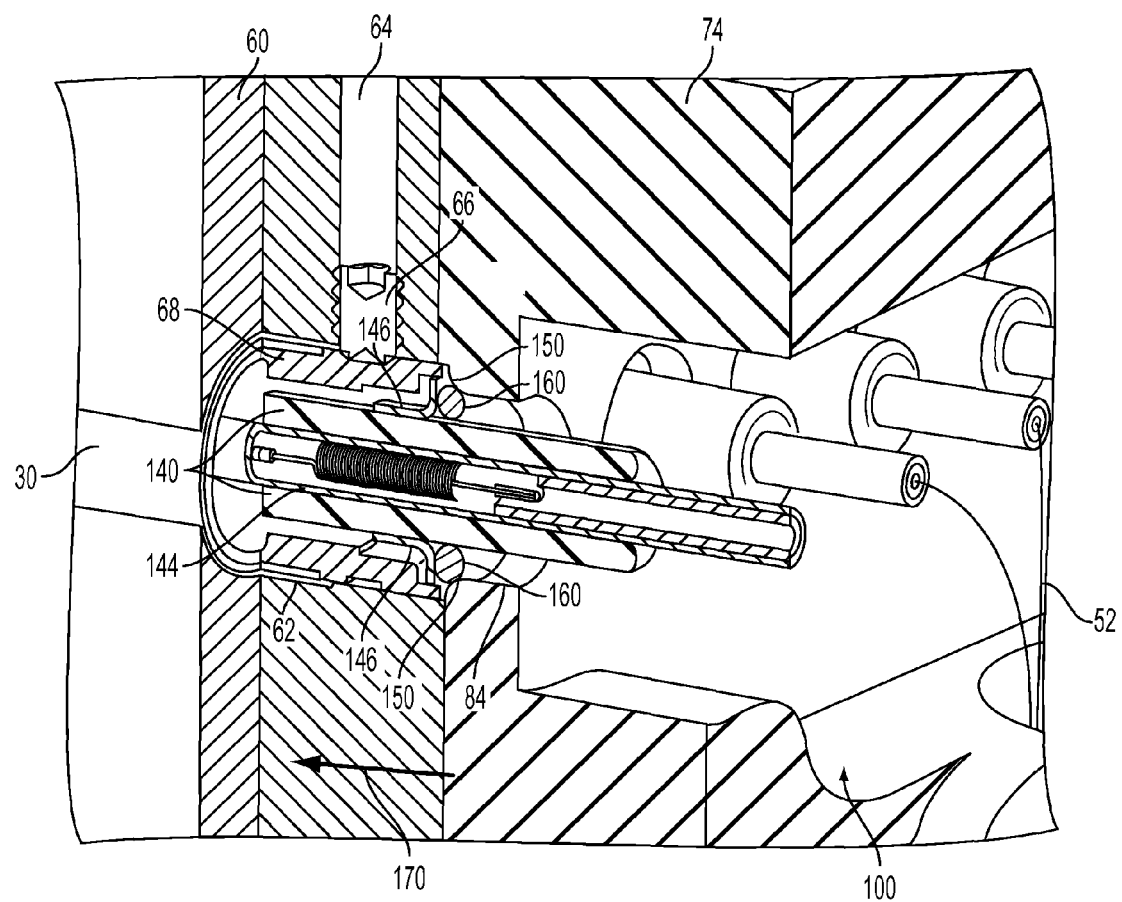
FIG. 4 is an enlarged, partially torn open perspective view of a detail taken at circular section 4 of FIG. 3 of an end of an example position sensitive detector within an example junction apparatus.

Turning now to FIG. 4, a detail taken at circular section 4 of FIG. 3 is illustrated. To further seal the second chamber 100, the position sensitive detectors 30 can be sealed with respect to the manifold portion 74. In an example, the position sensitive detectors 30 can include an insulator 140. The insulator 140 can extend around a wall 144 of the position sensitive detector 30. In an example, the insulator 140 includes a generally cylindrical shape, though other shapes are envisioned. The insulator 140 includes any number of materials, and in some examples, includes a ceramic material. In an example, a contact structure 146 can extend around the insulator 140 to define a radially outward projection from the insulator 140.

The insulator 140 can extend through the detector opening 62 of the attachment plate 60 and through the detector opening 84 of the manifold portion 74. In an example, the manifold portion 74 of the junction apparatus 40 includes a shoulder 150 that extends circumferentially around the insulator 140. The shoulder 150 can project inwardly towards the insulator 140. In the illustrated example, the shoulder 150 is positioned near an end of the detector opening 84 adjacent the attachment plate 60. In other examples, the shoulder 150 can extend radially inwardly (e.g., towards the insulator 140) a larger or smaller distance than as shown, and is not limited to the example of FIG. 4. The shoulder 150 has a generally rounded shape (e.g., curved, smooth, etc.) so as to reduce abrasion. In one example, the shoulder 150 does not form a right angle or have a relatively sharp corner.

A sealing device 160 can be provided to form a seal between the position sensitive detectors 30 and the junction apparatus 40. In an example, the sealing device 160 is positioned between the insulator 140 on one side and the shoulder 150 on an opposing side in the junction apparatus 40. The sealing device 160 is an elastically deformable sealing structure, such as an O-ring, that extends around the insulator 140 of the position sensitive detectors 30. In the illustrated example, the sealing device 160 has a shape (e.g., a circular shape, etc.) that generally matches the size of an opening between the insulator 140 and the shoulder 150. Of course, the sealing device 160 is not limited to such a shape, and in other examples, could include other cross-sectional shapes (e.g., square/quadrilateral shape, oval shape, etc.).

The sealing device 160 can include an inner radial dimension (e.g., diameter) that substantially matches an outer dimension (e.g., diameter) of the insulator 140. In other examples, however, the sealing device 160 could be larger or smaller than as shown, provided that the sealing device 160 still forms a seal in a manner described herein. The sealing device 160 can include an outer radial dimension (e.g., diameter) that substantially matches an inner dimension (e.g., diameter) of the shoulder 150. In an example, the sealing device 160 is positioned between the shoulder 150 of the manifold portion 74 on one side, and the insulator 140 on an opposing side. As such, the sealing device 160 will contact the shoulder 150 of the manifold portion 74 and the insulator 140 of the position sensitive detectors 30.

In operation, the manifold portion 74 can be moved in a direction 170 during attachment to the attachment plate 60. In an example, when fasteners are inserted into the attachment openings 82 (illustrated in FIG. 2), tightening of the fasteners will cause the manifold portion 74 to move in direction 170 towards the attachment plate 60. During this movement of the manifold portion 74, the position sensitive detectors 30 remain generally stationary with respect to the attachment plate 60. In particular, the securing device 66 can hold the tube portion 68 of the position sensitive detectors 30 relative to the attachment plate 60.

As the manifold portion 74 moves in the direction 170, the shoulder 150 of the manifold portion 74 will engage the sealing device 160. In an example, the shoulder will tend to move the sealing device 160 into contact with the contact structure 146 and the insulator 140. Further movement of the shoulder 150 can cause the sealing device 160 to compress and elastically deform. This compression of the sealing device 160 can form a seal with the insulator 140 on one side and with the shoulder 150 on another side. As such, the sealing device 160 functions by forming a seal, and limiting/restricting the passage of air, gas, fluids, etc. through the detector openings 62, 84. Accordingly, the second chamber 100 can be maintained at the second operating pressure that is different from the first operating pressure of the first chamber 22.

It will be appreciated that the shoulder 150 and the sealing device 160 are illustrated in FIG. 4 with respect to only one of the position sensitive detectors 30. However, the junction apparatus 40 may include generally identical shoulders 150 and sealing devices 160 to support and seal the other position sensitive detectors 30.

The atomic particle detection assembly 10 provides a number of benefits. For example, a distance between the position sensitive detectors 30 and the sensing electronics 50 can be reduced by positioning the sensing electronics 50 within the first housing 44 and/or the second housing 46. By reducing the distance between the position sensitive detectors 30 and the sensing electronics 50, a length of the wires 52 is also reduced and, thus, is shorter. As such, noise, signal degradation and other issues related to transmitting a signal over relatively long distances are reduced.

In addition, providing the sensing electronics 50 within the second chamber 100, which is maintained at the second operating pressure, is also beneficial. For example, the second chamber 100 is maintained at the second operating pressure that is different than the first operating pressure of the first chamber 22. In an example, the second operating pressure is maintained at or near atmospheric pressure while the first operating pressure is maintained at a negative operating pressure. The second chamber 100 is maintained at the second operating pressure due, at least in part, to the sealing device 160, with the sealing device 160 limiting the ingress/egress of air between the first chamber 22 and the second chamber 100. Maintaining the second chamber 100 at the second operating pressure is beneficial for the sensing electronics 50. For example, voltage breakdown of high voltage electronics may be more likely at pressures below atmospheric pressure (e.g., at pressures within the first chamber 22). Therefore, by storing the sensing electronics 50 within the second chamber 100, which is maintained at a pressure near atmospheric pressure, breakdown of the sensing electronics 50 is less likely.

In addition, the position sensitive detectors 30 can have a relatively smaller size (e.g., 8 mm, for example), such that the atomic particle detection assembly 10 can accommodate for a larger number of position sensitive detectors 30. Providing a larger number of position sensitive detectors 30 within the atomic particle detection assembly 10 can limit the likelihood of atomic particles 12 being undetected by the detection unit 20 containing the position sensitive detectors 30.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An atomic particle detection assembly including:
   one or more detectors configured to detect atomic particles, the detectors being positioned within a first chamber having a first operating pressure; and
   a pair of junction apparatuses positioned within the first chamber and supporting the detectors within the first chamber, one junction apparatus defining a second chamber having a second operating pressure that is different from the first operating pressure, wherein sensing electronics are operatively attached to the detectors and the sensing electronics are housed within the second chamber of the junction apparatus.

2. The atomic particle detection assembly of claim 1, wherein the one junction apparatus includes a shoulder extending around one of the detectors.

3. The atomic particle detection assembly of claim 2, further including a sealing device positioned between the shoulder and the detector within the junction apparatus.

4. The atomic particle detection assembly of claim 3, wherein the sealing device contacts the shoulder and the detector to seal the detector and the junction apparatus.

5. The atomic particle detection assembly of claim 1, wherein the second operating pressure is higher than the first operating pressure.

6. The atomic particle detection assembly of claim 1, wherein the one junction apparatus includes a first housing.

7. The atomic particle detection assembly of claim 6, wherein the first housing defines a portion of the second chamber such that the first housing is maintained at the second operating pressure.

8. The atomic particle detection assembly of claim 7, wherein the sensing electronics are housed within the first housing of the one junction apparatus.

9. The atomic particle detection assembly of claim 8, wherein a second chamber channel extends from the first housing towards the detectors.

10. The atomic particle detection assembly of claim 9, wherein the second chamber channel is maintained at the second operating pressure and supports wires extending between the detectors and the first housing.

11. An atomic particle detection assembly including:
    one or more detectors configured to detect atomic particles, the detectors being positioned within a first chamber having a first operating pressure;
    a pair of junction apparatuses positioned within the first chamber and supporting the detectors within the first chamber, one junction apparatus defining a second chamber having a second operating pressure that is higher than the first operating pressure; and
    sensing electronics operatively attached to the detectors and configured to receive detection signals from the detectors, the sensing electronics being housed within the second chamber of the one junction apparatus.

12. The atomic particle detection assembly of claim 11, wherein the one junction apparatus includes a shoulder extending circumferentially around one of the detectors.

13. The atomic particle detection assembly of claim 12, further including a sealing device positioned between the shoulder and the detector within the one junction apparatus.

14. The atomic particle detection assembly of claim 13, wherein the sealing device contacts the shoulder and the detector to seal the detector and the one junction apparatus.

15. The atomic particle detection assembly of claim 13, wherein the sealing device is elastically deformable.

16. An atomic particle detection assembly including:
one or more detectors configured to detect atomic particles, the detectors being positioned within a first chamber having a first operating pressure; and
a pair of junction apparatuses positioned within the first chamber and supporting the detectors within the first chamber, one junction apparatus supporting the detectors, the one junction apparatus defining a second chamber having a second operating pressure that is higher than the first operating pressure, wherein the detector is sealed with a shoulder of the one junction apparatus such that the second operating pressure is maintained with respect to the first operating pressure.

17. The atomic particle detection assembly of claim 16, wherein the shoulder extends circumferentially around one of the detectors.

18. The atomic particle detection assembly of claim 17, wherein the shoulder includes a rounded shape.

19. The atomic particle detection assembly of claim 18, wherein a sealing device contacts the shoulder and the detector to seal the one junction apparatus and the detector.

20. The atomic particle detection assembly of claim 19, wherein the sealing device is elastically deformable.

\* \* \* \* \*